United States Patent [19]

Fortin

[11] Patent Number: 4,653,911
[45] Date of Patent: Mar. 31, 1987

[54] AUTOCOLLIMATION METHOD AND APPARATUS

[76] Inventor: Michael A. Fortin, 1901 Halford Ave., #189, Santa Clara, Calif. 95051

[21] Appl. No.: 562,398

[22] Filed: Dec. 15, 1983

[51] Int. Cl.⁴ ............................................. G01B 11/26
[52] U.S. Cl. .................................... 356/153; 356/138
[58] Field of Search ................................ 356/153, 138

[56] References Cited

U.S. PATENT DOCUMENTS

| 3,531,205 | 9/1970 | Nussmeier | 356/153 |
| 3,721,488 | 3/1973 | Kuhne | 356/153 |
| 3,752,587 | 8/1973 | Myers et al. | 356/153 |
| 4,530,602 | 7/1985 | Pomphrey | 356/153 |

FOREIGN PATENT DOCUMENTS 1099213  2/1961  Fed. Rep. of Germany ...... 356/153

Primary Examiner—R. A. Rosenberger
Attorney, Agent, or Firm—Limbach, Limbach & Sutton

[57] ABSTRACT

An autocollimation method and apparatus are disclosed wherein a primary image of the reticle and a secondary image of the primary image which has been telescopically directed to and reflected from a remote reflecting surface are superimposed on a video display. The primary image of the reticle is produced along a first optical path and the secondary image of the reticle along second optical path including Cassegrainian focusing telescopic optical elements. The optical paths are provided with a commonly shared portion for alternatively positioning means of different optical magnification. Alternative magnification are provided for producing first and second images on the video display for first coarse and then fine determinations and/or adjustments.

4 Claims, 5 Drawing Figures

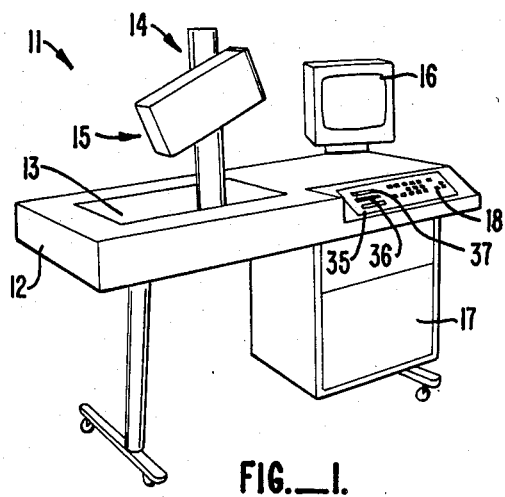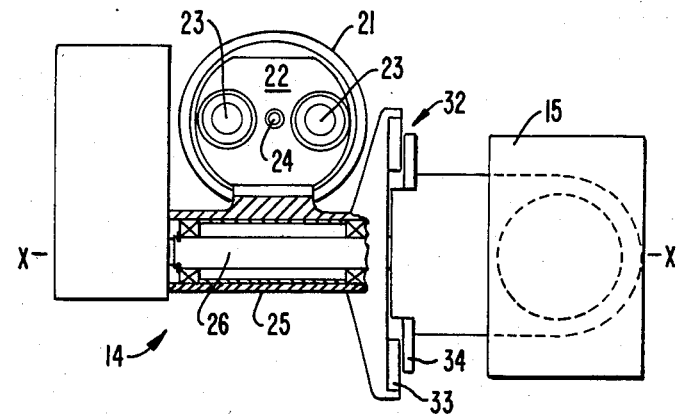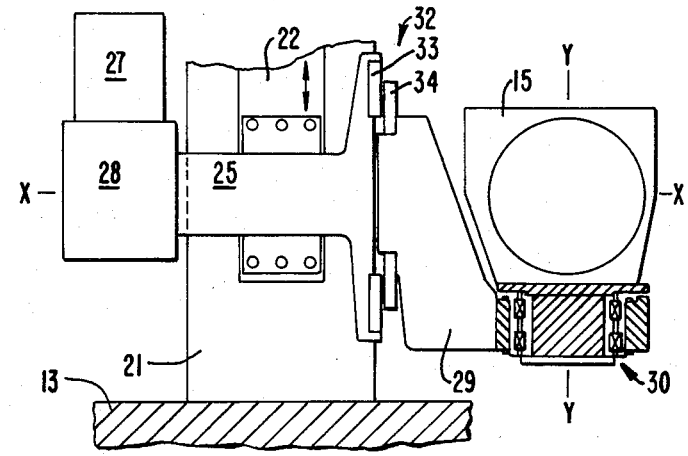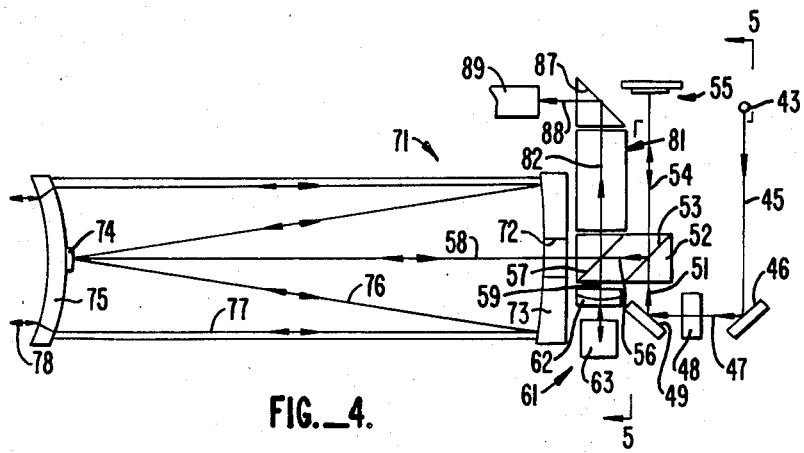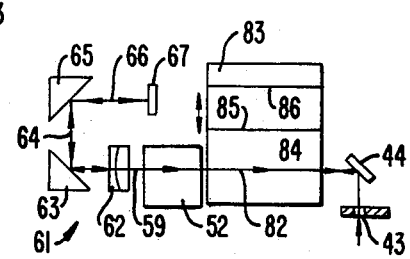
FIG._1.
FIG._2.
FIG._3.
FIG._4.
FIG._5.

AUTOCOLLIMATION METHOD AND APPARATUS

TECHNICAL FIELD

The present invention relates to video displayed superimposed images and more particularly to an autocollimation method and apparatus producing video displayed superimposed images.

BACKGROUND ART

Autocollimation involves techniques and apparatus of projecting an illuminated target at infinity and receiving the target image after reflection from a flat plane surface for performing a number of different functions. These functions include checking the parallelism of end surfaces of a member, comparing the angle of a work piece to a standard angle member, checking a surface for smoothness or flatness, checking the perpendicularity of surfaces, determining the amount of deflection in precision screws, determining deflection of elastic or springy materials and checking for differences in length between an object and a standard member.

The conventional autocollimator is a single instrument combining the functions of a telescope and a collimator to detect small angular displacements of a mirror surface by means of its collimated light. The device consists of a lens with a reticle rigidly mounted in its focal plane, the reticle being illuminated from the side by a plane reflector or small prism. The reticle usually carries several parallel lines subtending known angles at the lens. An electronic autocollimator provides a continuous output voltage, the sign and amplitude of which are correlated to the angular displacement of the mirror.

Commercial autocollimator devices commonly use a refractive type telescopic system having an ocular eyepiece into which the operator must look. Interpreting the data is therefore subjective. The commercial devices must be set up with expensive angle gauge blocks or master angles and are set up and operated manually.

SUMMARY OF THE INVENTION

Broadly stated, the present invention is directed to the method and apparatus of providing a video display of superimposed primary and secondary images. In the environment of an autocollimator which is the preferred mode of utilization of the present invention, the superimposed images are the primary image of the reticle and a secondary image of that primary image which has been telescopically directed to and reflected from a remote reflecting surface.

One feature and advantage of the present invention is the fact that the apparatus does not have to be manually set up and the subjective interpretation of data by the operator is eliminated.

In accordance with another aspect of the present invention, means are provided for producing the primary image of the reticle along a first optical path and means for producing a secondary image of the reticle along a second optical path and including Cassegrainian focusing telescopic optical elements along the second optical path whereby the secondary optical path is reflected back along its own length.

A feature and advantage of the aforementioned aspect of the present invention is the provision of a very short and therefore very stable optical assembly for an autocollimator.

In accordance with still another aspect of the present invention having the first and second optical paths, the optical paths are provided with a commonly shared optical path portion and means are provided for alternatively positioning means of different optical magnification on the commonly shared optical path portion.

In accordance with this last aspect of the present invention, alternative magnification can be provided for producing first and second images on the video display for first course and then fine determinations and/or adjustments.

These and other aspects, features and advantages of the present invention will become more apparent upon a perusal of the following description taken in conjunction with the accompanying drawings wherein similar characters of reference refer to similar parts in each of the several views.

DESCRIPTION OF THE DRAWINGS

FIG. 1 is a perspective view of an autocollimator apparatus in accordance with the present invention.

FIG. 2 is a top view, partially broken away, of a portion of the structure shown in FIG. 1.

FIG. 3 is an end elevational view of a portion of the structure shown in FIG. 2 taken along line 3—3 in the direction of the arrows.

FIG. 4 is an enlarged side elevational view of the optical elements of the autocollimator utilizing the present invention and tracing the optical path through the system.

FIG. 5 is an end elevational view of a portion of the structure shown in FIG. 4 taken along line 5—5 in the direction of the arrows.

DESCRIPTION OF THE PREFERRED EMBODIMENT

While the present invention has a number of different applications and configurations, the preferred embodiment is in the form of an autocollimation system 11 as shown in the drawings.

Referring now to the drawing with particular emphasis on FIGS. 1-3, an autocollimation system 11 in accordance with the present invention is provided with a base structure or table 12 including a fixed stable member such as a granite block 13. A movable support and drive system 14 mounted on the block 13 is provided for aligning and moving the lens optics and video camera apparatus 15 with respect to an element or an optical system under test and positioned on or mounted on the block 13. A video display 16 is provided for display associated with the lens optics and camera, and microprocessor based controls 17 are included in the base structure 12 controlled via the control panel 18.

The movable support and drive system 14 includes a vertical column 21 provided with an elevator mounting block 22 vertically movable within the column on a pair of alignment shafts 23 and driven up and down by means of a driven lead screw 24. A trunion shaft housing 25 connected to the elevator mounting block 22 houses a trunion shaft 26. Precise rotary motion of the trunion shaft 26 is produced from a motor 27, such as a stepper motor, through gear reduction, such as 4000 to one, in a gearbox 28. The other end of the trunion shaft is connected to a support platform 29 for the lens optics and video camera assembly 15. The horizontal rotational axis of the lens and video camera assembly 15 coincides with the axis of trunion shaft 26, and the lens optics and video camera assembly 15 is rotatable about a Y slue axis by means of a rotatable support assembly 30 on the support platform 29.

A rotary transducer assembly 32 having elements 33 connected to the trunion housing 25 and elements 34 connected to the support platform 29 provides position signals to indicate the precise rotation of the lens optics assembly 15 about the X axis for accurate determination of the instant angular position of the lens optics assembly 15 within one arc second.

The lens optics and camera assembly 15 is moved up and down by movement of the mounting block 22 on shafts 23, is rotated about the X axis by the motor 27 and is rotated about the Y axis by assembly 30.

The control panel 18 includes three digital displays of angular position of the lens assembly 15 each indicating a rotational position of the optic assembly 15 about the X axis in degrees, minutes and seconds. One display 35 indicates the angular position which the operator has set for lens assembly. A second display 36 shows the angular rotation through which the assembly has moved since the last setting and a third display 37 shows the true angular position determined by the transducer 32. There are button controls on the control panel 18 for setting the desired angular position, for producing rotation about the X axis clockwise or counter clockwise, for producing rotation about the Y axis and for producing vertical movement.

Referring now to FIGS. 4 and 5, there is shown a schematic illustration of the optical elements and light paths in the lens optics assembly 15. Light from a fiber optics light source (not shown) is reflected off a mirror 44 and follows a path 45 to another angled mirror 46 where the light is reflected to follow path 47 through a doublet lens 48 which magnifies and focuses the light onto a mirror 49 for reflection along a path 51. Light on path 51 passes through a beam splitter cube 52. In passing through the cube 52 light passes through a one way angled, transmissive surface 53 and follows path 54, colinear with path 51, to a reticle and reflecting mirror 55. The light forming the image of the reticle follows path 54 to the reflective side of transmissive surface 53 in the beam splitter cube 52 and thence follows path 56 in the cube 52 through to a semi-transmissive angled surface 57 in the block 52 wherein light forming a portion of the image of the reticle follows path 58 into the telescopic optics 71 and the other portion of the light of the reticle image follows path 59 in a reticle focusing optical assembly 61.

In the reticle focusing optical system 61, light following path 59 passes through a doublet lens 62 and reflects off an angled mirror 63 along a path 64 out of the plane of paths 45, 47, 51, 54, 56, 58 and 59 to another angled mirror 65 where the light is reflected along a path 66 to a reflective mirror 67. At the mirror 67 the light is redirected back along paths 66, 64, and 59 through the cube 52 where it passes directly through the angled surface 57 and follows path 82 in a superimposed image path for the main reticle image and the remotely reflected return reticle image. Along the superimposed image path 81 a magnification lens assembly 83 is provided which is movable laterally to position one of three magnification optical lens arrays on the path 82. Lens arrays 84, 85, and 86 are provided for producing magnifications of one, three and ten to the image on path 82. After passing through the magnification lens assembly 83 the light on path 82 is reflected off an angled mirror 87 along a path 88 into a video camera lens, schematically illustrated at 89.

The telescopic optics 71 are in the form of a modified Cassegrainian reflective-type telescopic system similar to those optics described by D. D. Maksutov in the Journal of the Optical Society of America, May, 1942. Light on path 58 passes through an aperture 72 in a primary concave mirror 73 and is reflected from a remotely spaced secondary mirror 74 positioned centrally on a lens 75. From the primary mirror 74 light follows a path 76 back to the primary mirror 73 and is again reflected along a path 77 through the lens 75 and thence as a parallel beam along a path 78 to the remote reflecting surface under test by the autocollimation system. From the remote reflecting surface the light travels back along paths 78, 77, 76, and 58 into the block 52 where it is reflected off the angled surface 57 to follow path 82 through the magnification lens assembly 83 of the superimposed image optics 81 to angled mirror, path 88 and the video camera lens 89.

The reticle image and remotely reflected return reticle image are displayed exactly superimposed on the video screen 16 if the remote reflecting surface is precisely perpendicular to the axis of the telescopic optics. If the remote reflecting surface is not precisely perpendicular to the telescopic axis, the images will not superimpose. The images will be separated by an amount indicative of the degree of disparity of the optic element under examination. Since the X and Y axes intersect the telescopic axis, the lens optics assembly can be rotated about these axes to cause the images to become superimposed.

The reticle itself has graduations representative of arc seconds around the rotational X axis. The superimposed reticle images will show the disparity in terms of arc seconds between the actual and desired angular relationship of the optical element under test in terms of arc seconds around both the X axis and the Y axis. By means of buttons on the control panel 18 the lens optics and video camera apparatus 15 can be rotated about the X axis and the Y axes to bring the reticle image and the reflected reticle image into conformity for a measurement of the degree of error of the elements or optical systems under test.

With the three different magnifications the magnification lens system 84 with the least magnification can be used first to enable the operator to make a course determination and/or adjustment and then the higher magnification lens assemblies 85 and 86 used to make fine determinations and/or adjustments.

As will be obvious from the foregoing, the lens optics and video camera assembly can be rotated to a desired position for directing the parallel beam onto a particular surface or into a particular optical system and then the lens optics 15 rotated through a predetermined angle to determine whether the elements under test conform to that same predetermined angle by again superimposing the reticle image and returned reticle image.

The intersection of the X and Y axes lies on the principal optical axis on paths 56 and 58 through the lens optics assembly 15. The lateral position of this intersection on the optical axis is chosen to be at the lateral point of balance of the combined support platform 29 and optic lens and camera assembly 15.

In an operative embodiment of the present invention having an aperture of 88.83 mm. and in which the entire lens optics and video camera apparatus 15 is confined to an overall length of less than 18 inches, the 1× magnification array 84 produces a 8.64 minute field of view while the 3× and 10× magnification arrays 85 and 86 respectively produce a 2.88 minute field of view and a 57.6 second field of view.

I claim:

1. Autocollimator apparatus comprising:

a reticle, a video camera having a lens, means for illuminating said reticle, first means for producing a first image of said reticle along a first optical path to said video camera and including optical elements for directing light along a reticle focusing path, second means for producing a second image of said reticle along a second optical path to said video camera lens and including telescopic optical elements for collimating light for transmission to and reflection from a remote reflecting surface, means for displaying said first and second images superimposed on a video display, and means for moving said first and second producing means with respect to the remote reflecting surface to superimpose said first and second images on said video display, a beam splitter cube having a first one-way angled transmissive surface means and a second angled semi-transmissive surface means, said first surface means for passing illuminating light to said reticle, for receiving image light from said reticle and passing the received light to said second surface means, said second surface means reflecting light to a reticle focusing path and passing light to said telescopic optical elements, said second surface means for receiving focused imaged light from said focusing path and passing the received focused image light to said video camera lens, said second surface means for receiving second image light from said telescopic optical elements and passing the received second image light to said second video lens.

2. The apparatus of claim 1 including a plurality of optical magnifying lens arrays, each array producing a magnification different from that of the other arrays and wherein said first and second optical paths of said first and second producing means include a commonly shared optical path portion, and means for alternatively positioning said arrays on said commonly shared optical path portion.

3. The apparaus of claim 1 wherein said telescopic optical elements of said second producing means includes an apertured primary concave mirror, a lens and a secondary mirror positioned axially of said lens, said mirrors and said lens axially aligned and positioned such that said second optical path passes axially through the primary mirror aperture to said secondary mirror, then back to said primary mirror, thence to and through said lens and thence to said remote reflecting surface.

4. The apparatus of claim 1 wherein said means for moving said first and second production means includes means for rotating the apparatus about mutually perpendicular axes with the intersection of said axes lying on the optical axis of said beam splitter cube through said first and second surface means at the point of balance of the optical lens elements and video camera.

* * * * *